United States Patent [19]

Severdia et al.

[11] 4,112,832
[45] Sep. 12, 1978

[54] ROTISSERIE AND CLOCKWORK MOTOR THEREFOR

[76] Inventors: Anton Severdia, 918 Washington St., Oakland, Calif. 94070; Adrian Joseph, 127 Boyo Vista, Oakland, Calif. 94611

[21] Appl. No.: 761,868

[22] Filed: Jan. 24, 1977

[51] Int. Cl.² ............................................. A47J 37/04
[52] U.S. Cl. ......................... 99/421 HH; 99/421 HV; 185/38
[58] Field of Search ................. 99/419, 421 R–421 V; 185/38; 308/20, 15, 203

[56] References Cited
U.S. PATENT DOCUMENTS

| | | | |
|---|---|---|---|
| 412,360 | 10/1889 | Barclay | 308/203 X |
| 2,477,183 | 7/1949 | Humensky | 99/421 H |
| 2,505,976 | 5/1950 | Leon | 99/421 HV |
| 2,735,222 | 2/1956 | Glass | 185/38 X |
| 3,228,289 | 1/1966 | Leitz et al. | 185/38 X |
| 3,298,247 | 1/1967 | Juno | 99/419 |
| 3,420,523 | 1/1969 | Foster | 185/38 X |
| 3,688,626 | 9/1972 | Cotey | 185/38 X |

*Primary Examiner*—Harvey C. Hornsby
*Assistant Examiner*—John M. Jillions
*Attorney, Agent, or Firm*—Julian Caplan

[57] ABSTRACT

Stanchions are supported vertically aligned and each carries a vertically adjustable clamp which carries two rollers which support the weight of a rotisserie spit. One clamp has a bracket which supports a clockwork motor. The motor is connected to the spit by a universal joint to compensate for non-parallel alignment of stanchions or non-level clamps. The motor has a rotatable first spool having a winding key, a pawl to permit winding, a shaft connected to the universal joint, and the first gear of a train. A second spool is rotatably mounted in the motor. A constant torque Negator spring is fixed to the first spool and is unwound therefrom onto the second spool. At the end of the train is a pinion having triangular teeth. A reciprocable escapement plate is driven by the end pinion to control the first spool shaft for constant speed, constant torque rotation of the spit.

8 Claims, 10 Drawing Figures

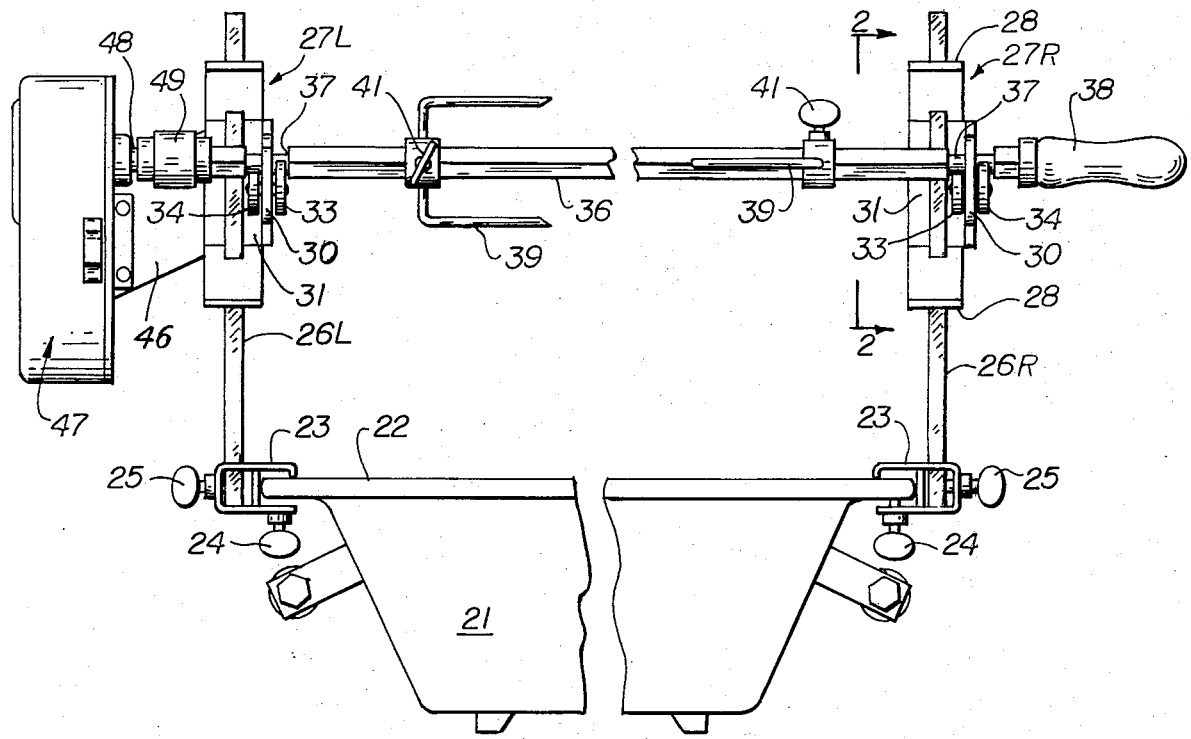
Fig. 1
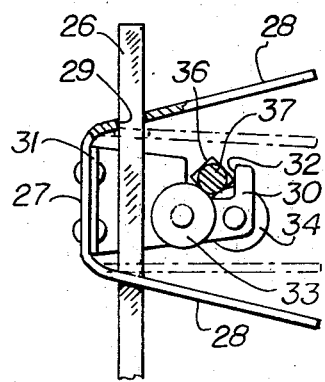
Fig. 2
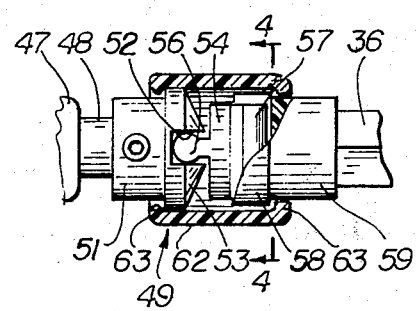
Fig. 3
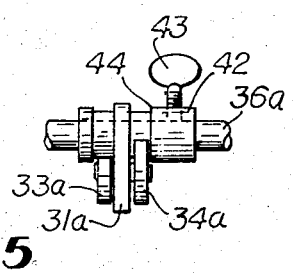
Fig. 5
Fig. 4

ROTISSERIE AND CLOCKWORK MOTOR THEREFOR

This invention relates to a new and improved rotisserie and clockwork motor therefor. More particularly, the invention relates to a device which may be used where electricity is not readily available to turn a spit over coals such as in a Hibochi. The device may be attached to the rim of the firepot of the Hibochi or it may be attached to stanchions which fit into the ground or are otherwise fixed in position relative to the coals. Thus adaptability to a variety of different installations and conditions is a principal feature of the invention.

A principal feature of the invention is the fact that clamps are slideable for vertical position adjustment on the stanchions and each clamp has a bearing on which the weight of the spit and its contents rests. Thus the spit turns freely and there is no weight supported by the motor. The function of the motor is merely to turn the spit.

Another feature of the invention is the fact that there is a universal joint connection between the motor shaft and the spit. This permits the opposite ends of the spit to be at different elevations and also accommodates non-parallel alignment of the stanchions without interference with the motor drive or imposing an unnecessary load on the motor. A further feature of the invention is the provision of an attachment which fits onto the spit shaft and is notched to accommodate the bearing which supports the spit so that spit shafts of non-uniform construction may be used with the device.

A still further feature of the invention is the provision of a constant torque-constant speed clockwork driven motor of a construction hereinafter described. The motor is characterized by the fact that it requires no lubrication.

Another feature of the invention is the escapement for the motor which oscillates about a pivot to time the unwinding of the clockwork motor. The escapement is rugged in construction and superior to ordinary clockwork escapements.

Although the motor hereinafter described has particular advantage in driving a rotisserie, nevertheless, it may also be used in installations where electricity is not readily available to drive other objects with constant speed and constant torque, such as mannequins, Christmas trees and a wide variety of other devices.

Other objects of the present invention will become apparent upon reading the following specification and referring to the accompanying drawings in which similar characters of reference represent corresponding parts in each of the several views.

In the drawings:

FIG. 1 is a front elevational view of the present invention installed on a Hibachi, the view being broken away to conserve space.

FIG. 2 is a fragmentary sectional view taken substantially along the line 2—2 of FIG. 1.

FIG. 3 is an enlarged view partly broken away in section of the universal joint connecting the clockwork motor shaft and the spit.

FIG. 4 is a sectional view taken substantially along the line 4—4 of FIG. 3.

FIG. 5 is a fragmentary view showing a modification of the invention incorporating a sleeve installed on a spit.

Figure 6:
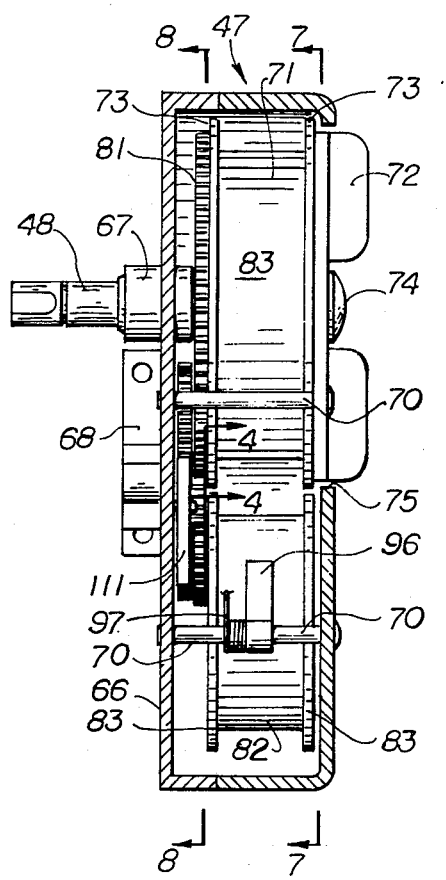
FIG. 6 is an enlarged view broken away in section of the clockwork motor.
Figure 7:
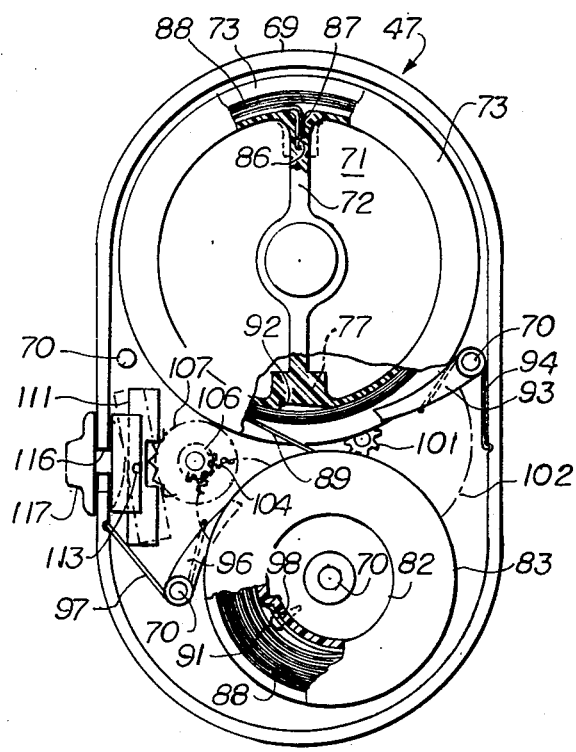
Figure 8:
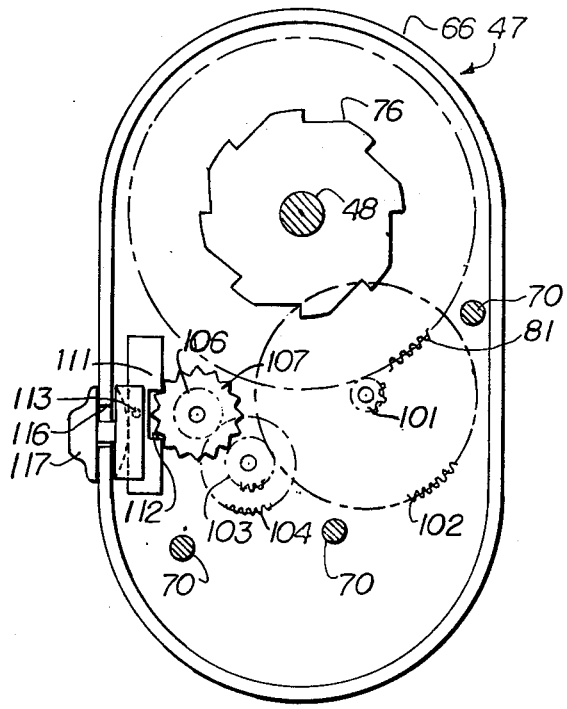

FIGS. 7 and 8 are, respectively, sectional views taken along the line 7—7 and 8—8 of FIG. 6.

Figure 9:
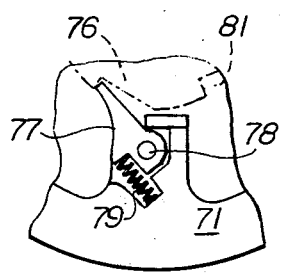

FIG. 9 is an enlarged fragmentary sectional view of the pawl for the motor spool.

Figure 10:
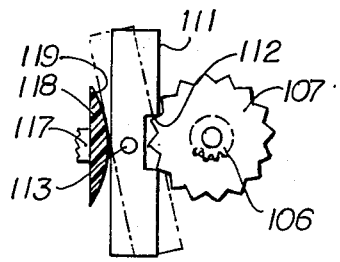

FIG. 10 is an enlarged view of the escapement and the stop mechanism for the motor.

The rotisserie of the present invention may be installed in a wide variety of different locations. As here shown, a typical installation is in a firepot 21 of the Hibachi type wherein charcoal or other fuel is burned. The firepot 21 has a rim 22 and to the rim 22 is attached a clamp 23 of generally U-shape which is secured by means of a thumbscrew 24. Generally vertical non-circular cross section stanchions 26L, 26R are attached to the clamps 23. It will be understood that other means of attachment may be used or the stanchions 26 may be greatly elongated and stuck into the ground where an open fire is used in the woods or on a beach, etc. The stanchions 26L, 26R are fixed relative to the clamps 23 by thumbscrews 25. Vertically slideable on each stanchion is a clamp 27L, 27L. Each clamp consists of outwardly diverging resilient leaves 28 formed with non-circular holes 29 through which the stanchion extends. By pinching the leaves 28 together from the solid line position of FIG. 2 to the dot-and-dash line position, the clamp 27 may be adjusted on the stanchion 26. Attached to clamp 27 is a bracket 31 having an outward projecting arm 30 which is formed with a notch 32 extending down from the upper edge of arm 30. On opposite sides of arm 30 are rotatable first and second rollers 33, 34. The rollers 33, 34 overlap when viewed in end elevation as in FIG. 2.

A spit 36 here shown to be square in cross section but formed with reduced diameter round necks 37 at the locations of the clamps 27L, 27R are supported by the rollers 33, 34, as best shown in FIG. 2 so that the weight of the spit 36 is absorbed by the clamps 27. Various means may be attached to the spit 36 for rotisserie purposes. The attachments of FIG. 1 are a pair of inward facing meat grip tines 39 held in position by thumbscrews 41. Other means may be used such as baskets, skewers, etc.

In FIG. 5 is shown a means to convert a spit 36a for use with the installation of FIG. 1 where it is desired to use a conventional spit rather than spit 36 shown in FIG. 1 which is of the proper distance between the necks 37 to accommodate the dimensions of the rim 22 of the firepot. In this installation, a sleeve 42 slides on the spit 36a and is located in position by thumbscrew 43. The sleeve 42 is formed with a necked-in portion 44 which corresponds to the neck 37 of the modification of FIGS. 1 and 2. Thus the sleeves 42 may be located in proper position to fit the particular installation.

One of the clamps 27 is provided with a longitudinally extending bracket 46 which supports the motor 47. The shaft 48 of the motor 47 is connected to the spit 36 by means of a universal joint 49, shown in detail in FIGS. 3 and 4. The purpose of the universal joint 49 is to accommodate conditions where the clamps 27L, 27R are at different levels or situations where the stanchions 26L, 26R are not parallel. Thus the motor shaft 48 carries a first sleeve 51 secured thereto and having at its distal end a notch 52 extending inward from the conical end of the sleeve 51. Intermediate joint portion 54 is connected in pivotal fashion to the sleeve 51. Thus the intermediate portion 54 has a rounded inner knob 56 which fits into the notch 52 and permits swiveling of the portion 54 relative to the sleeve 51. Opposite inner knob 56 is an outer knob 57 which is displaced 90° relative thereto and is also rounded. The knob 57 fits inside the hollow portion 58 of second sleeve 59. Spit 36 is slideably received in sleeve 59. To hold the universal joint 49 together there is an outer tube 62 which fits over the outside of sleeves 51, 59 and encloses the intermediate portion 54.

Motor 47, shown in detail in FIGS. 6–10, is housed within a casing consisting of half 66 formed with a hub 67 through which shaft 48 protrudes and a boss 68 to which bracket 46 is attached. Second casing half 69 is joined to half 66 by a plurality of pins 70. The halves 66, 69 are cup shaped and contain the motor mechanism. Mounted for rotation with shaft 48 is a first spool 71 formed on one end with a winding key 72 which protrudes through an opening 75 in casing half 69. By twisting the key 72, the spool 71 may be turned relative to shaft 48 to wind the motor as hereinafter appears. The spool 71 has rims 73 on either side to contain the spring 88 hereinafter described. Spool 71 is held in place by the enlarged head 74. Fixed to shaft 48 is a large gear 81 carrying on its inner face a ratchet gear 76. Spool 71 carries pawl 77 attached thereto by pin 78 and biased by means of spring 79 into engagement with ratchet 76. The effect of this arrangement is that when the user turns key 72 to wind the spring, the ratchet 76 slips past the pawl 77. As the spring 88 unwinds, however, the spool 71 and shaft 48 turn together as does gear 81.

On the opposite end of the casing is a second spool 82 likewise having rims 83 on either edge thereof to retain the spring 88 in place. One of the pins 70 comprises a shaft which second spool 82 turns freely.

A notch 86 is formed in spool 71 and spring 88 is formed with an enlarged end 87 which fills the notch 86 and prevents the spring from unwinding completely from the spool 71. Spring 88 is wound in a figure eight configuration, the spring crossing over in a crossover 89 so that it is wound on spool 82 in a direction opposite that which is wound on spool 71. The end of the spring 88 remote from end 86 is fixed to spool 82 by screw 91. To prevent further unwinding of spool 71 after the spring 88 has been completelyunwound therefrom, a notch 92 is formed in the spool 71 between the rims 73. Pivoted on one of the pins 70 is an unwinding limit lever 93 which is biased toward the spool 71 by spring 94. When the spring 88 is completely unwound from the spool 71, the end of the lever 93 remote from pin 70 lodges in the notch 92 and prevents further turning of the spool 71 in a counter-clockwise direction as viewed in FIG. 7. Hence the spool is prevented from excessive unwinding. Similarly, a second unwinding limit lever 96 is pivoted by means of another of the pins 70 and biased by spring 97 into proximity with second spool 82. Second spool 82 is formed with a notch 98 which is engaged by the distal end of lever 96 when the spring 88 is completely unwound therefrom.

The spring 88 is of a particular constant torque type known as a negator spring and is actually wound backwards. That is, the spring 88 tends to unwind from the spool 71, by reason of its being fixed by screw 91 to the second spool 82 as the spring 88 unwinds from the spool 71 it winds itself upon the free wheeling spool 82.

A clockwork train gear is connected to the large gear 81 which turns with the spool 71. Thus pinion 101 of set 101, 102 meshes with the gear 81. A second idler set 103, 104 is positioned so that the pinion 103 meshes with the gear 102 of set 101, 102. A third set consisting of pinion 106 and escapement gear 107 meshes with the gear 104.

The teeth of escapement gear 107, as best shown in FIG. 8, are isoceles triangles.

The escapement 111 which times the unwinding of spring 88 so that the speed of shaft 48 is constant is best shown in FIG. 8. The escapement 111 is generally rectangular in shape and is formed with a rectangular notch 112. As the escapement gear 107 turns, the teeth in turn cause the edges of the notch 112 to move away from the gear 107 and thus causes the escapement 111 to pivot about pin 113. The inertia of the escapement 111 performs the timing.

Casing half 66 is formed with an opening 116. On the exterior of the casing 66 is a thumb catch 117 having a stem extending inward of the casing and formed with a stop 118 on its inner end. One surface 119 of the stop 118 is rounded. When the catch 117 is in up position (FIG. 7 or FIG. 10), the surface 119 is out of contact with the escapement 111 as it oscillates around pin 113 (note that the dot-and-dash configuration of escapement 111 in FIG. 10 does not contact the surface 119). However, when the thumb catch 117 is depressed to the position of FIG. 8, the rounded surface 119 contacts the edge of escapement 111 and stops the escapement from oscillating and thus stops the spring 88 from unwinding.

In use, the stanchions 26L, 26R are positioned relative to the firepot in a manner heretofore explained. The spit 36 is raised and lowered by means of clamps 27L, 27R to the proper height, depending upon the speed of cooking desired and the level of the fire in the pot 21. It will be seen that one clamp 27 may be higher than the other and that the stanchions 26 need not be precisely aligned since the weight of the spit 36 and its contents is absorbed by the rollers 33, 34 and no additional torque is imposed thereby upon the motor 47. The user winds the motor 47 by turning the key 27, the pawl 77 sliding past the ratchet 76. The thumb catch 117 is moved from the down position of FIG. 8 to the up position of FIG. 7 allowing the escapement 111 to pivot about its pin 13. The spring 88 tends to unwind from the spool 71 and to wind itself upon the spool 82 causing the shaft 48 to turn as the spring unwinds. Turning of the shaft 48 causes the gear 81 to turn; and through the gear train heretofore described, causes the escapement gear 107 to revolve. As each tooth of the gear 107 comes into position adjacent the notch 112 it causes the escapement 111 to oscillate in either a clockwise or counterclockwise direction about the pin 113. The inertia due to the pivotal movement of the escapement 111 times the unwinding of the spring, and hence the spit 36 is turned at constant torque and constant speed.

What is claimed is:

1. A rotisserie attachment comprising a pair of stanchions, means holding said stanchions in approximately parallel relation to each other and in proximity to a fire container, a clamp slidably adjustable on each of said stanchions, a bracket projecting from each said clamp, a first and a second roller rotatably mounted on each said bracket, the outlines of said rollers viewed in elevation intersecting to provide a space between their upper peripheries, said bracket extending horizontally away from said stanchion and being formed on its upper edge with a notch, said rollers being mounted on either side of said notch and said space being within said notch, a spit fitting into said space, whereby said rollers support the entire weight of said spit and its contents, a motor, means mounting said motor from one of said stanchions, and drive means to turn said spit from said motor.

2. An attachment according to claim 1 in which said motor is spring driven.

3. An attachment according to claim 2 in which said motor is constant speed and constant torque.

4. An attachment according to claim 1 in which said drive means comprises a universal joint.

5. An attachment according to claim 4 in which said universal joint comprises a first part adapted to be turned by said motor and said first part being formed with a transverse first slot on one end, a second part formed with a first transverse rounded rib at one end shaped to fit within said first slot to permit pivotting of said second part relative to said first part and a second transverse rounded rib at its opposite end, said ribs being displaced 90° relative to each other, a third part similar to said first part having a transverse second slot to receive said second rib, and a sleeve containing said first, second and third parts.

6. An attachment according to claim 1 in which said clamp comprises a vertical base, said bracket being fixed to said base, and a pair of resilient diverging leaves projecting outwardly from said base, each said leaf being formed with a hole larger than said stanchion through which said stanchion extends, whereby when said leaves are pinched toward each other said holes permit raising and lowering of said clamp and when said leaves are released the edges of said holes grip said stanchion.

7. A motor according to claim 3 in which said motor comprises a casing formed with an opening, a motor shaft rotatable in said casing, a first gear fixed to said motor shaft, a first spool mounted on said motor shaft, a ratchet and pawl connection between said first spool and said first gear whereby rotation of said spool turns said first gear in one direction only, a winding key on said first spool manually engageable through said opening, a second spool rotatably mounted within said casing, a spring fixed at its opposite ends to said spools, said spring being wound up on said first spool by turning said winding key, said spring being biased to unwind from said first spool on to said second spool, a speed reduction gear train mounted in said casing comprising said first gear and an escapement gear, an escapement pivotally mounted in said casing and formed with a notch into which said escapement gear projects, whereby the teeth of said escapement gear cause oscillation of said escapement.

8. A spring-driven constant speed, constant torque motor comprising a casing formed with an opening, a motor shaft rotatable in said casing, a first gear affixed to said motor shaft, a first spool mounted on said motor shaft, a ratchet and pawl connection between said first spool and said first gear whereby rotation of said spool turns said first gear in one direction only, a winding key on said first spool manually engageable through said opening, a second spool rotatably mounted within said casing, a first spring fixed at its opposite ends to said spools, said first spring being wound up on said first spool by turning said winding key, said first spring being biased to unwind from said first spool onto said second spool, a speed reduction gear train comprising said first gear and an escapement gear mounted in said casing, an escapement pivotally mounted in said casing and formed with a notch into which said escapement gear partially extends, whereby said teeth of said escapement gear strike alternately the opposed edges of said notch in said escapement to cause oscillation of said escapement to time rotation of said motor shaft, said second spool being formed with a notch, an unwinding latch pivotally mounted in said casing, a second spring biasing the distal end of said latch toward said second spool, said first spring when wound around said second spool holding said latch out of engagement with said notch and when said first spring is completely unwound from said second spool said second spring forcing the distal end of said latch into engagement with said notch to prevent further unwinding of one of said spools.

* * * * *